C. E. FARRELL.
ADJUSTABLE HEADLIGHT.
APPLICATION FILED APR. 23, 1913.

1,095,095.

Patented Apr. 28, 1914.

Witnesses
Hugh H. Ott
D. W. Gould

Inventor
Charles E. Farrell
By Victor J. Evans
Attorney

UNITED STATES PATENT OFFICE.

CHARLES E. FARRELL, OF EAST ST. LOUIS, ILLINOIS.

ADJUSTABLE HEADLIGHT.

1,095,095.     Specification of Letters Patent.     Patented Apr. 28, 1914.

Application filed April 23, 1913. Serial No. 763,099.

*To all whom it may concern:*

Be it known that I, CHARLES E. FARRELL, a citizen of the United States, residing at East St. Louis, in the county of St. Clair and State of Illinois, have invented new and useful Improvements in Adjustable Headlights, of which the following is a specification.

The invention relates generally to adjustable head lights for use particularly upon street railway or electric cars, comprehending a construction in which the position of the light is automatically controlled so as to cause the light rays to follow the track thereby avoiding the usual deflection of the light incident to passage around a curve.

The main object of the present invention is the provision of a head light carried on and supported by the car and moving in unison with the forward truck so that when the car body is deflected in traveling around a curve the truck will automatically maintain the light in position to project the light rays along the track.

The invention in its preferred form of details will be described in the following specification, reference being had particularly to the accompanying drawings, in which:—

Figure 1:
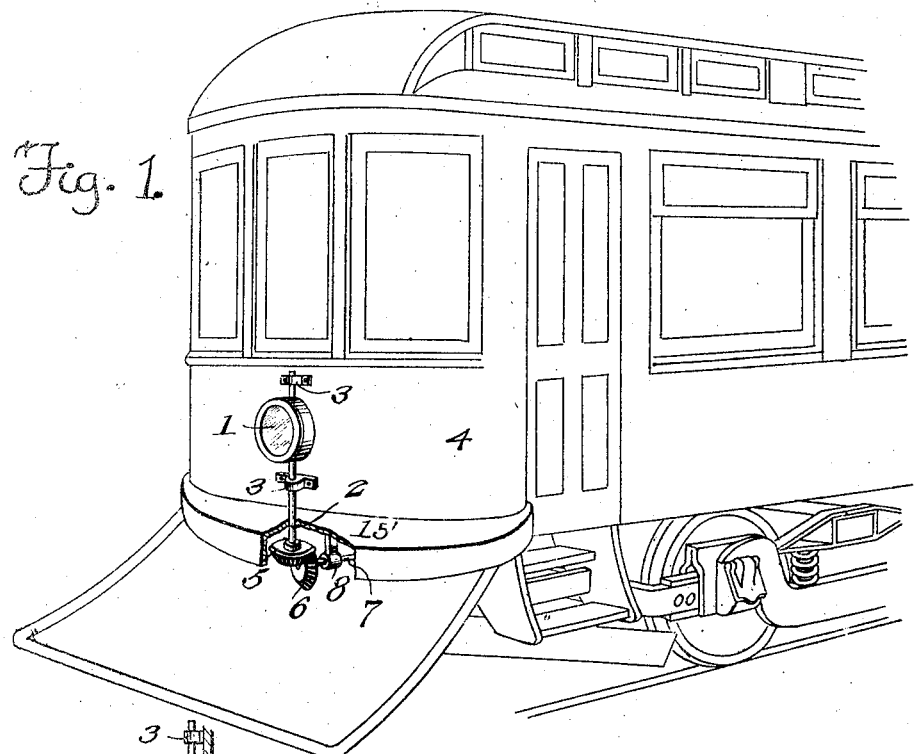
Figure 2:
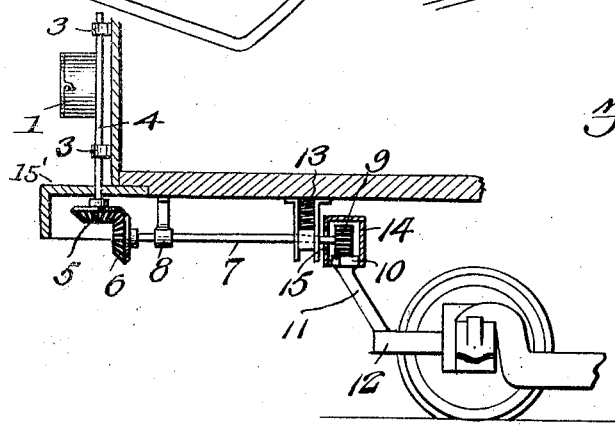

Figure 1 is a broken perspective of the car illustrating the application of the improvement thereto. Fig. 2 is a view in elevation partly in section, illustrating the improvement in applied position.

Referring particularly to the accompanying drawings, the improved lamp 1 which may be of any type designed is supported upon a rod 2 fixed in bearings 3 on the forward dash of the car 4, or any other appropriate position as may be provided. The lower end of the rod 2 is provided with a beveled gear 5 arranged to mesh with a similar gear 6 fixed upon the forward end of the rod 7 extending lengthwise the car beneath the floor or platform thereof. The rod 7 is mounted in bearings 8 and at its inner end which is arranged immediately adjacent and in advance of the forward truck is provided with a pinion 9 arranged to mesh with the segmental rack 10 supported upon two spaced arms 11 fixed to and rising from the adjacent underlying portion 12 of the truck frame. The pinion 9 is maintained in coöperating contact with the track 10 by springs 13 interposed between the rod and the bar platform, thus obviating the possibility of disconnection incident to wear of the bearings 8.

I have preferred to inclose the pinion 9 and segmental rack 10 by a casing 14 in order to protect the parts against dust and dirt, the forward walls of the casing being preferably formed with an elongated slot 15 to permit the necessary relative movement of the rack and rod.

As a material and important part of the present invention from a structural standpoint I prefer that the rod 2 pass through an opening formed in the upper surface of the usual bumper 15′ of the car and the gears 5 and 6 be disposed immediately below the upper wall of this bumper so that said gears are located beneath and protected within the bumper.

In use it will be obvious that in movement of the car body relative to the trucks, as in turning curves or the like will through the coöperation of the segmental rack and pinion cause rotary movement of the rod 7 which through the gears 5 and 6 is transmitted to the rod 2 to turn the lamp relative to the car body or in other words, to maintain the lamp in approximately fixed relation to the truck. By this construction, the light rays will all follow the track, thus affording the motorman a clear view of the track in rounding curves, where it is desirable that such view be had, as will be obvious.

The present invention is not particularly concerned as to the head light as I contemplate any desired construction of this element.

What is claimed is:—

The combination with a car body having a forward bumper, and a truck supporting the body, of a headlight, a rod rotatably mounted on the car and extending through the bumper, said rod supporting the headlight, a rod rotatably mounted beneath the car, intermeshing gears carried by said rods, said gears being located beneath and protected by the bumper, a segmental rack carried by the truck, a pinion fixed on the rod rotatably mounted beneath the car, said pinion engaging the rack, and a casing inclosing said pinion and rack.

In testimony whereof I affix my signature in presence of two witnesses.

CHARLES E. FARRELL.

Witnesses:
SAMUEL T. VAN DE VEER.
FRANK F. JAMISON.